United States Patent [19]

Niekrasz et al.

[11] Patent Number: 4,691,486

[45] Date of Patent: Sep. 8, 1987

[54] GLASS ASSEMBLY FOR REFRIGERATOR DOORS AND METHOD OF MANUFACTURE

[76] Inventors: Frank Niekrasz, 18009 Loomis Ave., Homewood, Ill. 60430; Andrew Menke, 8600 W. 145th Pl., Orland Park, Ill. 60462

[21] Appl. No.: 372,993

[22] Filed: Apr. 29, 1982

[51] Int. Cl.[4] .......................... E06B 7/12; F16B 12/46; A47F 3/04; H05B 3/08

[52] U.S. Cl. ...................................... 52/172; 219/218; 219/522; 219/541; 219/547; 403/295; 312/140; 312/257 SK

[58] Field of Search ................. 312/140, 257 SK, 263; 403/295, 402; 108/23; 52/220, 172, 171; 219/218, 522, 547, 203, 213, 345, 541

[56] References Cited

U.S. PATENT DOCUMENTS

| | | | |
|---|---|---|---|
| 2,733,788 | 2/1956 | Farmer | 403/295 |
| 3,276,832 | 10/1966 | Reilly | 312/140 |
| 3,353,854 | 11/1967 | Hansen | 52/475 |
| 3,399,294 | 8/1968 | Thieben | 219/203 |
| 3,438,164 | 4/1969 | Duepree | 312/263 |
| 3,553,913 | 1/1971 | Eisenberg | 52/172 |
| 3,642,310 | 2/1972 | Hudson | 52/220 |
| 3,655,939 | 4/1972 | Stromquist | 219/218 |
| 3,760,157 | 9/1973 | Newmann et al. | 219/522 |
| 3,866,380 | 2/1975 | Benson | 403/295 |
| 3,896,589 | 7/1975 | Mitchell | 52/172 |
| 3,901,572 | 8/1975 | Litchfield | 312/263 |
| 3,911,245 | 10/1975 | O'Shaughnessy | 219/218 |
| 4,127,765 | 11/1978 | Heaney | 219/218 |
| 4,164,105 | 8/1979 | Herbst et al. | 52/202 |
| 4,222,209 | 9/1980 | Peterson | 52/172 |
| 4,240,765 | 12/1980 | Offterdinger | 403/402 |
| 4,291,928 | 9/1981 | Kiyosawa | 312/257 SK |
| 4,306,140 | 12/1981 | Stromquist | 219/218 |
| 4,361,369 | 11/1982 | Zwillich | 312/257 SK |

FOREIGN PATENT DOCUMENTS

| | | | |
|---|---|---|---|
| 2162381 | 6/1973 | Fed. Rep. of Germany | 52/475 |
| 7900054 | 2/1979 | Sweden | 403/402 |
| 1437198 | 5/1976 | United Kingdom | 219/203 |

*Primary Examiner*—Carl D. Friedman
*Assistant Examiner*—Michael Safavi

[57] ABSTRACT

A multiple pane glass assembly having at least one pane that is electrically heatable. The glass panes of the assembly are disposed in closely spaced, side-by-side relation with a spacer interposed between adjacent panes. The spacers include a plurality of hollow tubular members disposed near the peripheral edges of the panes with adjacent ends of the tubular members connected by corner key elements. Electrical lead wires extending from an interior electrically heatable surface of one of the panes are directed through respective apertures or passageways in the corner key elements, into the end of a respective tubular member connected to the corner key element, and through the tubular spacer members to a common egress location. The corner key elements are adapted to retain desiccant material in at least some of the tubular members, which together with sealant applied about the periphery of the assembly, enables an air-tight sustantially vapor-free condition to be maintained in the space between panes. Because the electrical lead wires are trained through the tubular spacer members, sealant may be applied about the outer periphery of the assembly and the assembly efficently handled without the impediment of exposed lead wires. The apertured corner key elements further permit easy filling of the interior of the assembly with an inert gas to improve its insulating efficiency.

9 Claims, 9 Drawing Figures

GLASS ASSEMBLY FOR REFRIGERATOR DOORS AND METHOD OF MANUFACTURE

DESCRIPTION OF THE INVENTION

The present invention relates generally to glass assemblies for doors and windows, and more particularly, to multiple pane glass assemblies in which at least one pane is electrically heated.

Glass assemblies for refrigerator and freezer doors typically have two or more glass panes with adjacent panes separated by a tubular metal spacer disposed adjacent the outer periphery of the panes. To electrically heat a front or outermost pane, the inside surface thereof customarily is coated with a conductive material and appropriate lead wires are electrically coupled thereto, such as through bussbars mounted on opposed sides of the conductive material. The bussbar lead wires are passed transversely through the spacer separating the panes and are trained about the outer periphery of the spacer to an appropriate location for connection to an electrical source. For maintaining a substantially moisture-free condition in the space between the panes, the hollow spacers generally are filled with a desiccant material and the outer periphery of the assembly is coated with a suitable sealant, which also serves to embed the otherwise exposed portions of the lead wires. To further enhance the thermal insulating efficiency of the assembly, the space between the glass panes may be filled with an inert gas.

Heretofore, a number of problems have been incurred in the manufacture of such electrically heated glass assemblies. Because the electrical lead wires must be passed from the interior of the assembly out through the spacer, it has been necessary to form one or more exit apertures transversely through the metal tubular spacer. To protect the lead wires from damage from sharp edges of the metal spacer about the aperture, a grommet or other protective means is inserted in the aperture. The insertion and securement of such grommets in the tubular spacer members has been cumbersome and has impeded the manufacturing operation. Because the lead wires extend through the spacer and loosely about the periphery of the assembly prior to application of the outer sealant, this has further impeded automated handling of the glass panes during assembly, as well as application of the sealant. Problems have further been incurred in retaining desiccant in the spacers during their assembly, as well as in filling the space between the glass panes with inert gas.

It is an object of the present invention to provide a multiple pane electrically heatable glass assembly which lends itself to more efficient and automated manufacture.

Another object is to provide a glass assembly as characterized above in which the electrical lead wires do not impede automated handling of the assembly during manufacture nor the efficient application of sealant about the periphery of the assembly.

A further object is to provide a glass assembly of the foregoing type which eliminates the need for passing the electrical leads transversely through the metal tubular spacer members in the manner heretofore required, or installing grommets in the tubular spacer members, or embedding or retaining electrical leads about the outer periphery of the assembly during application of the outer sealant.

Still another object is to provide a glass assembly of the above kind which utilizes spacers with corner key elements adapted to effectively secure the tubular spacer members in place during their fabrication, permit the exit of electrical leads from the interior space between assembled panes, retain desiccant in the tubular members, and facilitate filling of the interior of the assembly with an inert gas.

Yet another object is to provide an improved method of manufacture of glass assemblies of the foregoing type.

Other objects and advantages of the invention will become apparent upon reading the following detailed description and upon reference to the drawings, in which.

Figure 4:
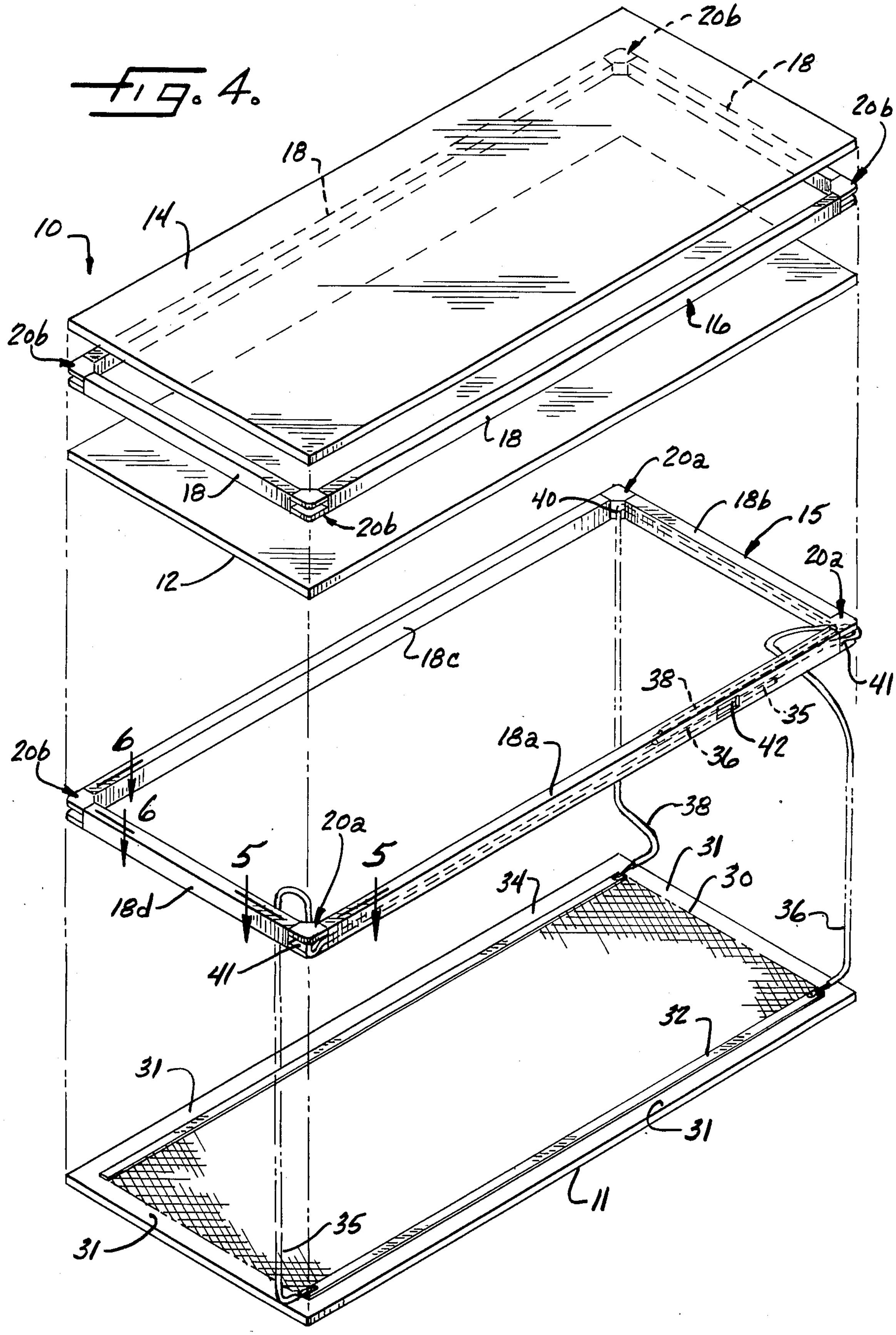
FIG. 4 is an enlarged exploded view of components parts of the illustrated glass assembly during its manufacture.
Figure 5:
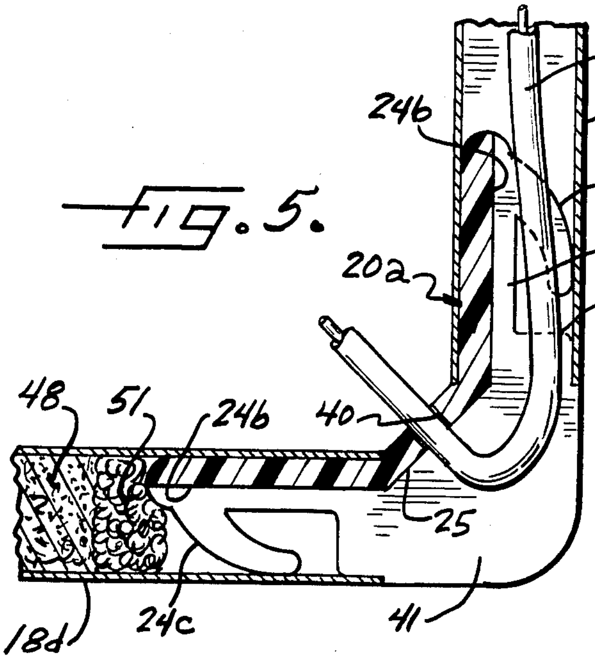
Figure 9:
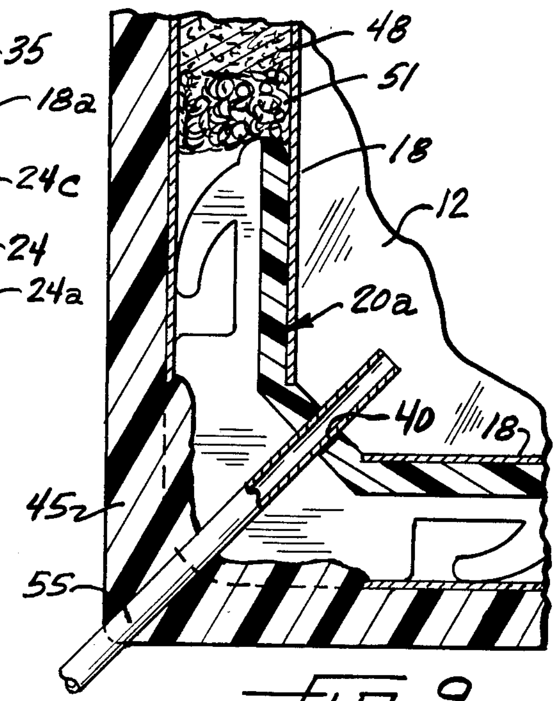
Figure 6:
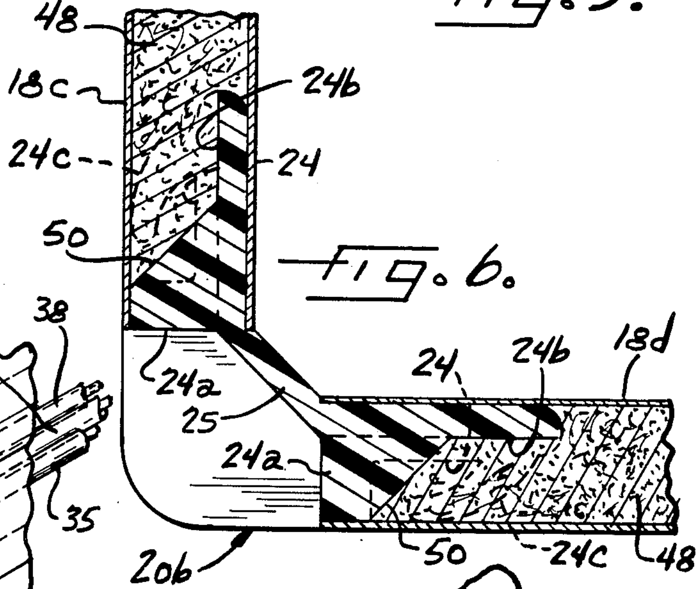
Figure 7:
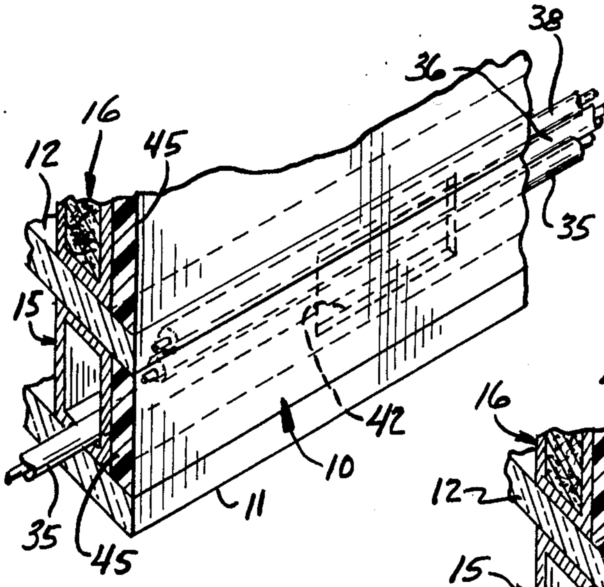
Figure 8:
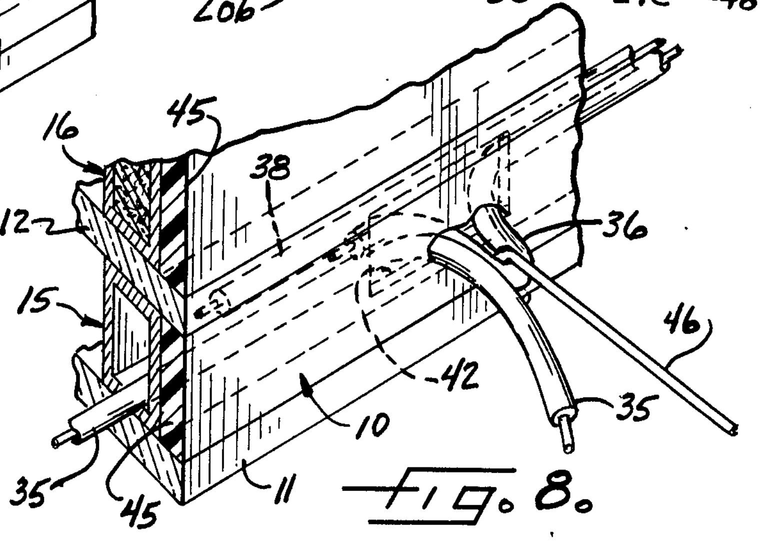

FIGS. 5 and 6 are enlarged fragmentary sections taken in the planes of lines 5—5 and 6—6 in FIG. 4;

FIG. 7 is an enlarged sectional perspective of the components shown in FIG. 4 after their assembly and the application of an outer or secondary sealant;

FIG. 8 is an enlarged sectional perspective, similar to FIG. 7, showing the electrical lead wires being pulled from their egress opening following application of the outer or secondary sealant; and FIG. 9 is an enlarged fragmentary section showing a further alternative use of the apertured corner key elements employed in the glass assembly of the present invention in permitting easy filling of the interior of the assembly with an inert gas.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the invention is to cover all modifications, alternative constructions and equivalents falling within the spirit and scope of the invention.

Referring now more particularly to the drawings, there is shown an illustrative three-pane, rectangularly-shaped, glass assembly 10 embodying the invention which is particularly adapted for use in refrigerator and freezer doors and the like. The assembly 10 includes an electrically heatable front pane 11 (shown as the lowermost pane in the drawings), a middle pane 12, and a rear pane 14, all disposed in parallel spaced side-by-side relation. As will be understood by one skilled in the art, the glass assembly 10 typically will be mounted in a refrigerator or freezer door with the front electrically heatable pane 11 in contact with ambient air and the rear pane 14 in contact with refrigerated air. The front and rear panes 11, 14 preferably are made of tempered glass so as to resist and minimize the danger of accidental breakage during use.

In order to maintain the panes 11, 12 and 14 in predetermined spaced relation, a spacer 15 is interposed between the front and middle panes 11, 12 and a spacer 16 is interposed between the middle and rear panes 12, 14. The spacers 15, 16 in this instance each comprise four elongated tubular members 18 disposed in a rectangular arrangement between the respective panes, slightly inset from the peripheral edges of the panes.

For coupling abutting ends of the tubular members 18 at each corner of the spacers, corner key elements 20*a,* 20*b,* are provided. The corner key elements 20*a,* 20*b* each have a pair of perpendicularly disposed legs 24 interconnected by an intermediate bite section 25. The legs 24 of each corner key element 20*a,* 20*b* are adapted for insertion into the ends of the perpendicularly disposed tubular members 18 and are formed with respective complementary shaped hub portions 24*a* over which the end of the tubular member is positioned. To provide additional support of the assembled tubular members, each corner key leg 24 includes a hub extension 24*b* that extends further into the assembled tubular spacer member 18 and is shaped complimentary to one side of the tubular member.

In accordance with one aspect of the invention, for facilitating insertion of the corner key legs 24 into the end of the tubular spacer members 18 during fabrication and for restraining subsequent withdrawal movement, each leg extention 24*b* has rearwardly and outwardly extending gripping fingers 24*c* that protrude outwardly a distance slightly greater than the perimeter of the hub portion 24*a.* The corner key elements 20*a,* 20*b* preferably are made of plastic and the gripping fingers 24*c* extend rearwardly with a curved outer surface such that when the corner key legs 24 are inserted into the tubular spacer member 18, the gripping fingers 24*c* tend to be forced inwardly toward the hub extension 24*b.* Pressure resulting from such inwardly directed force on the gripping fingers 24*c* thereupon serves to positively retain the tubular member in place during remaining fabrication of the spacer.

In order to provide a primary vapor seal between the glass panes and fabricated spacers 15, 16, a primary sealant 29, such as butyl-polysolbutylene, is applied between each side of the spacers and the adjacent pane. As is known in the art, such sealant should have high adhesion qualities between the glass and metal spacer and be suitable for service in a temperature range of about 50° F. to 250° F. without loss of flexibility.

To permit electrical heating of the front pane 11 for controlling condensation, the inside surface thereof is provided with a conductive coating 30 which may be applied to the glass pane in a known manner. The conductive coating 30 in this case covers the entire inside surface of the pane 11, except for a relatively narrow border 31 adjacent the peripheral edges upon which the spacers 15, 16 are disposed. Suitable bussbars 32, 34 are mounted in electrical contact with the conductive coating 30 along the opposite long sides thereof, and in the illustrated embodiment a pair of positive lead wires 35, 36 are coupled to opposite ends of the bussbar 32 and a single neutral lead wire 38 is connected to one end of the opposite bussbar 34.

Pursuant to another aspect of the invention, the bussbar leads each are directed through a respective immediately adjacent corner key element, into the end of a tubular member connected thereto, and then through the tubular members about the periphery of the assembly to a common exit location, thereby enabling the assembly to be more efficiently handled and an outer sealant applied without the impediment of exposed lead wires. To this end, the corner key elements 20*a* adjacent the respective bussbar leads 35, 36, 38 each are formed with an aperture 40 extending diagonally through the bite section 25 into communication with an outer peripheral groove 41 in the corner key element which extends between the ends of the tubular members 18 connected to the corner key element. The groove 41 in this case is defined by spacing between the gripping fingers 24*c* of each leg and a similar central recessed area in both the hub and bite portions 24*a,* 25, respectively, of the corner key element.

Figure 1:
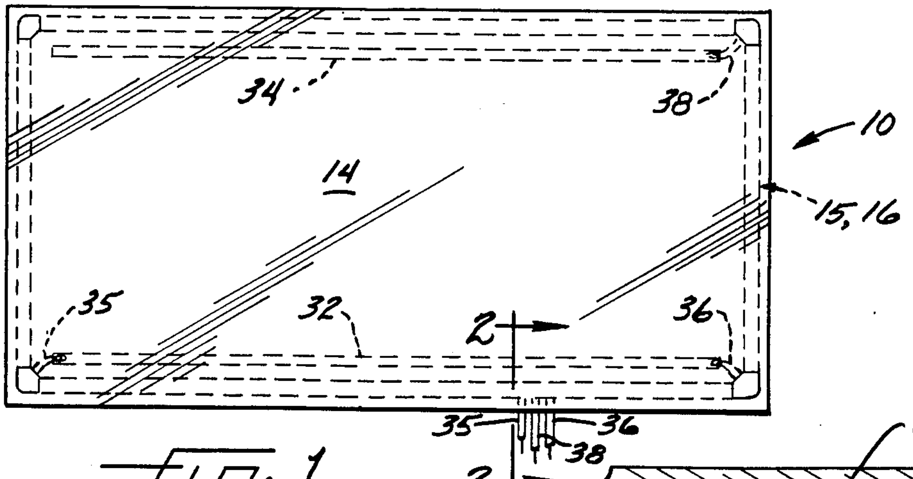
FIG. 1 is a plan view of an illustrated glass assembly embodying the present invention.
Figure 2:
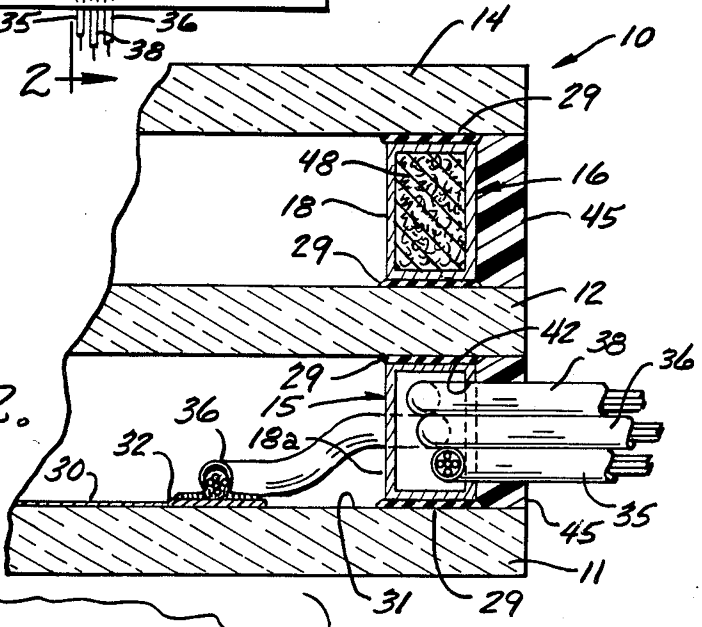
FIG. 2 is an enlarged fragmentary section taken in the plane of line 2—2 in FIG. 1.
Figure 3:
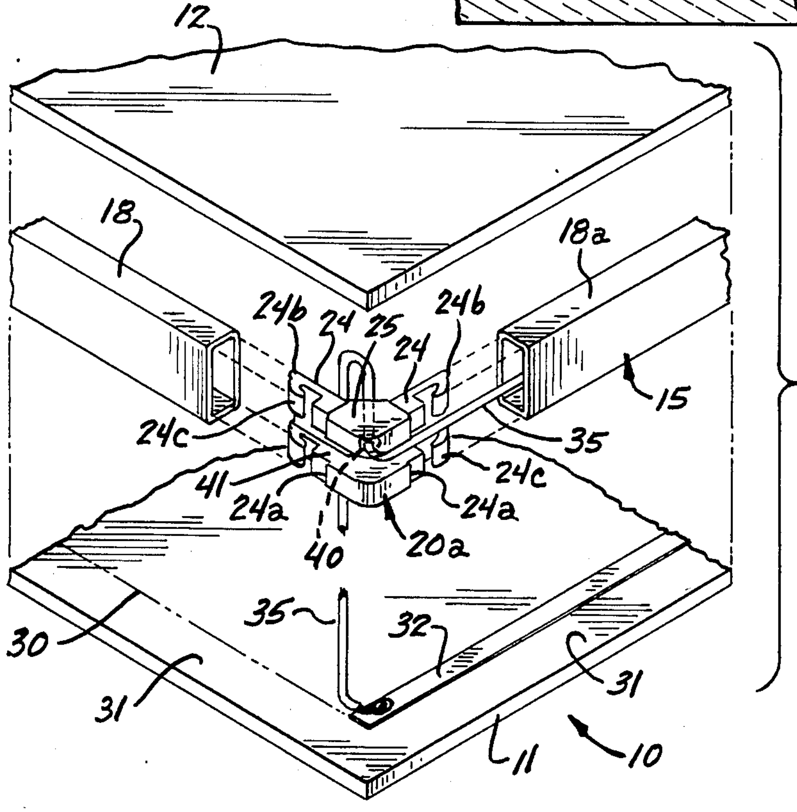
FIG. 3 is an enlarged exploded view of one corner of the illustrated glass assembly.

During manufacture of the glass assembly 10, as best depicted in FIGS. 3–5, it can be seen that the bussbar lead wire 35 may be directed from the end of the bussbar 32 through the aperture 40 in the immediately adjacent corner key 20*a,* through the corner key groove 41, and into the end of the tubular member connected thereto (designated 18*a* in FIGS. 2–5), and then through the tubular member 18*a* to a point beyond a common egress opening 42 formed in an outer face of the tubular member. The bussbar lead 36 similarly may be directed through the aperture 40 of the immediately adjacent corner key 20*a,* through the corner key groove 41 into the end of the tubular member 18*a,* and through the tubular member 18*a* to a point beyond the egress opening 42. The bussbar lead wire 38 is directed through the aperture 40 and groove 41 of the adjacent corner key element 20*a,* through the tubular member designated 18*b* in FIG. 4, about the groove 41 in the corner key 20*a* at the opposite end of the member 18*b,* and then through tubular member 18*a* to a point beyond the egress opening 42.

It will be appreciated that in the glass pane and spacer assembly illustrated in FIG. 4 the lead wires are all confined within the tubular members 18, which in effect serve as electrical wire conduits. In such condition, the assembly may be readily handled by automated equipment without loose wires impeding handling and transfer. Moreover, a secondary or outer sealant 45, such as polysulfide synthetic rubber, also may be efficiently and uniformly applied to the outer periphery of the assembly (as shown in FIG. 7) without concern for loose lead wires disposed about the perimeter, and without the need for embedding the lead wires in the secondary sealant, as heretofore have been problems in the manufacture of such heated glass assemblies.

Following application of the secondary sealant 45, the ends of the bussbar lead wires 35, 36, 38 may be readily pulled from the egress opening 42 in the tubular spacer member by means of a wire hook 46 or the like (as shown in FIG. 8) and an additional amount of the secondary sealant 45 may be applied about the exiting lead wires to reseal the egress opening as necessary, insuring an airtight interior of the assembly.

To facilitate maintenance of a dry condition in the space between the glass panes, at least some of the tubular spacer members are filled with a moisture absorbing desiccant material 48. In the illustrated embodiment, desiccant material 48 is provided in each tubular member 18 which does not serve as a bussbar lead wire conduit. Accordingly, in the spacer 16 each of the tubular spacer members is filled with desiccant material and in the spacer 15 the two tubular members, designated 18*c,* 18*d* in FIG. 4, which do not contain bussbar leads similarly contain desiccant.

In keeping with the invention, the legs of the corner key elements 20*b* are adapted to plug the ends of desiccant-containing tubular members 18 for retaining the desiccant therein during fabrication and subsequent use of the spacers. To this end, as shown in FIG. 6, each of the corner key elements 20*b* have an integrally formed dam 50 in the peripheral groove 41 of each leg 24, which serves to block communication of the groove 41 with the end of the tubular member 18 mounted on the leg. In the illustrated embodiment, corner key elements 20*b* with such conduit plugging legs are used in each corner of the spacer 16. Since none of the tubular members 18 of the spacer 16 serve as lead wire conduits, the intermediate bite sections 25 of the corner key elements 20*b* are not formed with a wire passage aperture as are the corner key elements 20*a*.

In the illustrated spacer 15, a corner key element 20*b* with conduit plugging legs is used only at the corner of the spacer 15 connecting the ends of the two desiccant-containing tubular members 18*c*, 18*d*, and cotton or other plugging material is inserted into the opposite end of the tubular members 18*c*, 18*d*, prior to insertion of the leg of the apertured corner key element 20*a*, as illustrated in FIG. 5, to plug the respective end of the member. Alternatively, the leg 24 of each corner key element 20*a* plugging the end of the desiccant-containing tubular members 18*c*, 18*d* could be formed with a dam, similar to the dam 50 of the corner keys 20*b*, while the other leg of the corner key could be formed with the uninterrupted groove for permitting passage of the bussbar lead through the corner key aperture and into the connected tubular member.

It will be understood by one skilled in the art that the electrically heatable glass assembly 10 made according to the method of the present invention lends itself to efficient and automated handling. The front pane 11 is formed in the usual manner with an electrically conductive inner coating 30, bussbars 32, 34 on opposite sides thereof, and appropriate electrical leads 35, 36, 38 extending from the ends of the bussbars; the spacers 15, 16 are fabricated with the use of corner key elements 20*a*, 20*b*; the bussbar leads are directed through a respective immediately adjacent corner key element into the end of a connected tubular spacer member, and through the tubular spacer members 18 to points extending beyond a common egress opening 42 in one of the tubular members; primary sealant 29 is applied between the sides of the spacers 15, 16 and the immediately adjacent glass panes 11, 12, 14; a secondary sealant 45 is applied about the outer periphery of an assembled glass panes and spacers while the bussbar leads all are contained within the spacer tubular members 18; the ends of bussbar leads are thereupon pulled out of the tubular spacer egress opening 42; and additional sealant 45 applied around the lead wires at the egress opening as is necessary to ensure proper sealing.

In keeping with still a further aspect of the invention, the apertured corner keys element's 20*a* may be utilized to facilitate filling the interior spacing between the glass panes with an inert gas to enhance the insulating efficiency of the assembly. In such case, a corner key element 20*a* may be used in the spacers 15, 16 in a corner that is not required for exiting of a electrical lead wire. As illustrated in the alternative embodiment shown in FIG. 9, a reuseable gas nozzle tube 55 may be positioned in such corner key elements 20*a* for each spacer prior to application of the secondary sealant 45. Upon application of the secondary sealant 45, the glass assembly will be sealed with the tubes 55 extending therefrom, which can thereupon be utilized in supplying an inert gas, such as argome, sulfur hexafluoride, carbon dioxide, or mixtures thereof, into the interior spacing between the respective glass panes 11, 12 and 14. Upon filling of the spaces with such gas, the tubes 55 may be removed and the apertures in the corner key elements 20*a* filled with secondary sealant. It will be understood that alternatively a removal plug could be inserted into the corner key element apertures prior to application of the secondary sealant, which upon removal would permit gas to be supplied directly through the corner key aperture, which could then be sealed as indicated above.

From the foregoing, it can be seen that since the bussbar lead wires are contained within the tubular spacer members prior to and during application of the secondary sealant, the assembly can be handled and the sealant applied without concern for loose lead wires about the periphery of the assembly and without the necessity for embedding such lead wires in the secondary sealant. The process also eliminates the need for use of lead wire protective grommets or the like in the tubular spacer members which heretofore have been cumbersome to install. The spacer corner key elements also serve to facilitate assembly of the spacers, to permit the exit of electrical leads from the interior space between assembled panes, retain desiccant in the tubular members, and facilitate filling of the interior of the assembly with inert gas. It will be understood that while the invention has been described in connection with an electrically heatable glass assembly, the corner key elements of the present invention may be used in unheated glass assemblies.

We claim:

1. A glass assembly comprising a pair of similarly sized glass panes disposed in side-by-side relation, a spacer interposed between said panes for maintaining said panes in parallel relation with an airspace therebetween, said spacer including a plurality of hollow tubular members disposed adjacent the peripheral edges of said panes corner key elements connecting together ends of adjacent pairs of said tubular members, said corner key element each having a pair of perpendicularly disposed interconnected legs, said legs each being adapted for mounting into an end of a respective tubular spacer member, at least some of said corner key elements being formed with a first electrical lead wire passage means extending about the periphery of the corner key element communicating between the ends of two tubular members connected to said corner key element for permitting electrical lead wires to be trained about said corner key element from the end of one of the tubular members connected thereto and into the end of another tubular member connected thereto, and said some corner key elements being further formed with second electrical lead wire passage means communicating between said air space and said first passage means for permitting an electric lead wire within said air space to be directed through said second and first passage means of the corner key element and into either tubular member connected thereto, one of said panes having a conductive surface on a side thereof adjacent said airspace, a plurality of lead wires electrically coupled to said conductive surface, said lead wires coupled to said conductive surface being trained through the passage means of some of said corner key elements and longitudinally through some of said tubular members to an egress opening therein, said lead wires extending out of said egress opening to a location outside the periphery of said tubular members and glass panes, and means sealing the periphery of said assembly with said lead wires extending outwardly therefrom.

2. A glass assembly comprising a pair of similarly sized glass panes disposed in side-by-side relation, a spacer interposed between said panes for maintaining said panes in parallel relation with an airspace therebetween, said spacer including a plurality of hollow tubular members disposed adjacent the peripheral edges of said panes, corner key elements connecting together adjacent ends of pairs of said tubular members at respective corners of said assembly, said corner key elements each having a pair of perpendicularly disposed interconnected legs, said legs each being adapted for mounting into an end of a respective tubular spacer member, one of said panes having a conducitve surface on a side thereof adjacent said airspace, lead wires electrically coupled to said conductive surface, at least some of said corner key elements being formed with a groove about the periphery of the legs thereof communicating between the ends of two tubular members connected to said corner key element for permitting electrical lead wires to be trained about a periphery of said corner key element from the end of one of the tubular members connected thereto and into the other of the tubular members connected thereto, said some corner key element further being formed with an aperture communicating between said air space and said peripheral groove for permitting passage of a lead wire within said air space through the corner key element and said peripheral groove and into an end of either of the tubular members connected thereto, said lead wires coupled to said conductive surface each being trained through the apertures and grooves of some of said corner key elements and longitudinally through some of said tubular members to a common egress opening in one of said tubular members, said lead wires extending out of said egress opening to a location outside the periphery of said tubular members and glass panes, and means sealing the outer periphery of said assembly with said lead wires extending outwardly therefrom.

3. The glass assembly of claim 2 in which said glass panes are rectangular shaped and said spacer comprises four substantially straight tubular members connected together by four of said corner elements, bussbars mounted on opposed sides of said conductive surface for electrically coupling said lead wires to said conductive surface, said bussbars each having opposite ends in relatively close proximity to a respective one of said corner key elements, and said lead wires extending from the respective ends of said bussbars and through the aperture and peripheral groove of the proximate corner key element.

4. A glass assembly comprising a pair of similarly sized glass panes disposed in side-by-side relation, a spacer interposed between said panes for maintaining said panes in parallel relation with an airspace therebetween, said spacer including a plurality of hollow tubular members disposed adjacent the peripheral edges of said panes, corner key elements connecting together adjacent ends of pairs of said tubular members at respective corners of said assembly, one of said panes having a conductive surface on a side thereof adjacent said airspace, lead wires electrically coupled to said conductive surface, at least some of said corner key elements having passage means including an aperture extending through said corner key element and a groove about the periphery of the corner key element communicating both with said aperture and the ends of adjacent tubular members connected to said corner key element for permitting passage of a lead wire coupled to said conductive surface into an end of a tubular member connected to said corner key element, said lead wires each extending through said passage means in a respective one of said corner key elements and into an end of and longitiudinally through said tubular members to a common egress opening in one of said tubular members, said lead wires extending out of said egress opening to a location outside the periphery of said tubular members and glass panes, and means sealing the outer periphery of said assembly with said lead wires extending outwardly therefrom.

5. A glass assembly comprising a pair of similarly sized glass panes disposed in side-by-side relation, a spacer interposed between said panes for maintaining said panes in parallel relation with an airspace therebetween, said spacer including a plurality of hollow tubular members disposed adjacent the peripheral edges of said panes, corner key elements connecting together adjacent ends of pairs of said tubular members at respective corners of said assembly, said corner key elements each having a pair of legs for insertion into the ends of respective pairs of tubular members for forming a corner of said spacer, said legs of each corner key element being connected by a bite section, one of said panes having a conductive surface on a side thereof adjacent said airspace, lead wires electrically coupled to said conductive surface, at least some of said corner key elements having passage means including an electrical lead wire receiving groove extending about the outer periphery of the legs and bite section thereof for communicating between the ends of two tubular members connected to the legs of said corner key element and for permitting electrical lead wires to be trained about the outer periphery of said corner key element from the end of one of the tubular members connected thereto and into the end of the other tubular member connected thereto, and said corner key element passage means further including an aperture extending through said bite section for communicating between the air space between said panes and said peripheral groove and for permitting an electrical lead wire within said airspace to be passed through the corner key aperture and peripheral groove and into the end of either of the tubular members connected to the corner key element, said lead wires coupled to said conductive surface each extending through the passage means of some of said corner key elements and longitudinally through some of said tubular members to a common egress opening in one of said tubular members, said lead wires extending out of said egress opening to a location outside the periphery of said tubular members and glass panes, and means sealing the outer periphery of said assembly with said lead wires extending outwardly therefrom.

6. The glass assembly of claim 5 in which each of said corner key element legs has gripping means positionable into the end of a respective tubular member connected thereto for resisting reverse movement therefrom.

7. The glass assembly of claim 5 in which each said corner key leg is formed with a hub portion shaped complementary to the end of a tubular member connected to the corner key element, and each said hub portion includes an extension disposed further within said tubular spacer member, said hub extension for each corner key leg including rearwardly and outwardly extending resilient gripping fingers for engaging a tubular member connected thereto and resisting reverse movement thereof.

8. The glass assembly of claim 5 in which at least some of said tubular members are filled with vapor-absorbing desiccant material, and said corner key element legs extending into said desiccant-containing tubular members retain said desiccant material therein.

9. A glass assembly comprising a pair of similarly sized glass panes disposed in side-by-side relation, a spacer interposed between said panes for maintaining said panes in parallel relation with an airspace therebetween, said spacer including a plurality of hollow tubular members disposed adjacent the peripheral edges of said panes, corner key elements connecting together ends of adjacent pairs of tubular members, said corner key element each having a pair of perpendicularly disposed interconnected legs, said legs each being adapted for mounting into an end of a respective tubular spacer member, at least some of said corner key elements being formed with a first electrical lead wire passage means extending through the legs thereof and communicating between the ends of two tubular members connected to said corner key element and second electrical wire passage means communicaing between said air space and said first passage means, one of said panes having a conductive surface on a side thereof adjacent said airspace, bussbar means disposed in electrically connective relation on opposite sides of said conductive surface, said bussbar means having ends in close proximity to a respective corner key element, a plurality of lead wires each coupled to an end of one of said bussbar means and extending through the second and first passage means in a respective proximately located corner key element and into the end of a tubular member connected thereto, and at least one of the lead wires extending through the first passage means of a corner key element from one tubular member connected thereto into the other tubular member connected thereto, at least one of said tubular members being formed with an egress opening through which said lead wires extend to a location outside the periphery of said tubular members and glass panes, and means sealing the periphery of said assembly with said lead wires extending outwardly therefrom.

* * * * *